(12) United States Patent
Park et al.

(10) Patent No.: US 10,598,067 B2
(45) Date of Patent: Mar. 24, 2020

(54) EXHAUST PURIFICATION SYSTEM OF CONTROLLING INJECTION AMOUNT OF REDUCING AGENT

(71) Applicants: Hyundai Motor Company, Seoul (KR); Kia Motors Corporation, Seoul (KR); FEV Europe GmbH, Aachen (DE)

(72) Inventors: Jin Woo Park, Seoul (KR); Ki Hyung Joo, Gyoenggi-do (KR); Myung Jong Lee, Gyeonggi-do (KR); Arun Palaniappan Muthukaruppan, Aachen (DE); Waldemar Josef Kansy, Dusseldorf (DE); John Henry Kwee, Erkelenz (DE)

(73) Assignees: Hyundai Motor Company, Seoul (KR); Kia Motors Corporation, Seoul (KR); FEV Europe GmbH, Aachen (DE)

( * ) Notice: Subject to any disclaimer, the term of this patent is extended or adjusted under 35 U.S.C. 154(b) by 181 days.

(21) Appl. No.: 15/826,468

(22) Filed: Nov. 29, 2017

(65) Prior Publication Data
US 2019/0112953 A1    Apr. 18, 2019

(30) Foreign Application Priority Data
Oct. 16, 2017  (KR) .......................... 10-2017-0134051

(51) Int. Cl.
*F01N 3/00* (2006.01)
*F01N 3/20* (2006.01)
(Continued)

(52) U.S. Cl.
CPC .............. *F01N 3/208* (2013.01); *F01N 3/035* (2013.01); *F01N 3/0814* (2013.01);
(Continued)

(58) Field of Classification Search
CPC ...... F01N 3/208; F01N 3/0842; F01N 3/0814; F01N 9/00; F01N 9/005
(Continued)

(56) References Cited

U.S. PATENT DOCUMENTS

| 9,435,244 B1 | 9/2016 | Devarakonda |
| 2010/0050614 A1* | 3/2010 | Parmentier ............. F01N 3/208 60/287 |

(Continued)

FOREIGN PATENT DOCUMENTS

| JP | 5861921 B2 | 2/2016 |
| KR | 10-1664702 B1 | 10/2016 |

*Primary Examiner* — Jason D Shanske
(74) *Attorney, Agent, or Firm* — Mintz Levin Cohn Ferris Glovsky and Popeo, P.C.; Peter F. Corless

(57) ABSTRACT

Provided is an exhaust purification system that may include: a first catalyst installed on a rear exhaust pipe of an engine; a selective catalytic reduction (SCR) catalyst installed on the rear exhaust pipe of the first catalyst; a reducing agent injector which is installed on an exhaust pipe between the first catalyst and the SCR catalyst and configured to inject a reducing agent; and a controller configured to control an amount of reducing agent injected from the reducing agent injector. /The controller may calculate a total amount of ammonia adsorbed in the SCR catalyst, a required amount of reducing agent based on a total amount of ammonia adsorbed in the SCR catalyst, and the amount of nitrogen oxide introduced into the SCR catalyst, and then control a reducing agent injector to inject the required amount of reducing agent.

19 Claims, 10 Drawing Sheets

(51) Int. Cl.
*F01N 9/00* (2006.01)
*F01N 3/035* (2006.01)
*F01N 3/08* (2006.01)

(52) U.S. Cl.
CPC ............ *F01N 3/0842* (2013.01); *F01N 9/00* (2013.01); *F01N 9/005* (2013.01); *F01N 2610/02* (2013.01); *F01N 2610/1453* (2013.01); *F01N 2900/0406* (2013.01); *F01N 2900/1616* (2013.01); *F01N 2900/1622* (2013.01)

(58) Field of Classification Search
USPC .......................................................... 60/287
See application file for complete search history.

(56) References Cited

U.S. PATENT DOCUMENTS

| | | | |
|---|---|---|---|
| 2014/0032189 A1* | 1/2014 | Hehle | .................... F01N 3/208 703/2 |
| 2016/0346732 A1* | 12/2016 | Schmitt | .................... F01N 9/00 |
| 2016/0369676 A1* | 12/2016 | Hendrickson | ........... F01N 3/208 |

\* cited by examiner

EXHAUST PURIFICATION SYSTEM OF CONTROLLING INJECTION AMOUNT OF REDUCING AGENT

CROSS-REFERENCE TO RELATED APPLICATION

This application claims priority to and the benefit of Korean Patent Application No. 10-2017-0134051 filed in the Korean Intellectual Property Office on Oct. 16, 2017, the entire contents of which are incorporated herein by reference.

TECHNICAL FIELD

The present invention relates to an exhaust purification system that may control an injection amount of a reducing agent. The exhaust purification system may calculate accurately an amount of ammonia adsorbed in a selective catalytic reduction (SCR) catalyst by considering flow uniformity according to arrangement of catalysts and control an injection amount of the reducing agent according to the amount of ammonia in the exhaust purification system.

BACKGROUND

In general, exhaust gas discharged from an engine of a vehicle through an exhaust manifold is introduced to a catalytic converter installed in an exhaust pipe. The purified exhaust gas is discharged in the atmosphere through a tail pipe after noise is attenuated while passing through a muffler. The catalytic converter also purifies pollutants included in the exhaust gas. In addition, a particulate filter for collecting particulate matters (PMs) included in the exhaust gas is mounted on the exhaust pipe.

A denitrification catalyst (DeNOx catalyst) has been used in the catalytic converter to purify nitrogen oxide (NOx) included in the exhaust gas. For instance, when the reducing agent such as urea, ammonia, carbon monoxide and hydrocarbon (HC) is supplied to the exhaust gas, nitrogen oxide included in the exhaust gas may be reduced through oxidation-reduction reaction with the reducing agent in the DeNOx catalyst.

A lean NOx trap (LNT) catalyst may been mainly used as the DeNOx catalyst. For example, when an engine is operated in an atmosphere having a lean air-fuel ratio, the LNT may adsorb the nitrogen oxide included in the exhaust gas, and when the engine is operated in an atmosphere having a rich air-fuel ratio, the LNT may desorb the adsorbed nitrogen oxide and reduce the desorbed nitrogen oxide and the nitrogen oxide included in the exhaust gas.

Recently, as the regulation of the exhaust gas was strengthened, the use of the SCR catalyst with or without the LNT catalyst has been increased. For instance, when SCR catalyst is mainly applied to a vehicle, a reducing agent injector may be installed in the exhaust pipe to inject the reducing agent to the exhaust gas and the reducing agent may be included in the SCR catalyst with the exhaust gas to reduce the nitrogen oxide in the SCR catalyst.

However, in order to provide the SCR catalyst in the vehicle, many components, such as a reducing agent tank for storing the reducing agent, an reducing agent injector for injecting the reducing agent, a mixer for evenly mixing the injected reducing agent with the exhaust gas, a pipe for feeding the reducing agent from the reducing agent tank to the reducing agent injector, and the like, need to be installed in the vehicle, which may require large space for installation of the exhaust purification system.

However, in the vehicle, a space for installing catalytic converters may be limited due to the interference with other components. For instance, the catalytic converters may be at a location close to the exhaust manifold of the engine, an underflow location of the vehicle body, and the like.

Since at least two catalysts may be required to satisfy strict regulations for exhaust gas, recently, the catalysts have been provided by coating the SCR catalyst on the particulate filter or closely approaching the SCR catalyst to a first catalyst. For instance, the reducing agent injector for injecting the reducing agent may be installed between the first catalyst and the SCR catalyst. Because a distance between the reducing agent injector and the SCR catalyst may be short, the reducing agent injected from the reducing agent injector may not be uniformly mixed with the exhaust gas and supplied to the SCR catalyst. Accordingly, excess ammonia may be supplied in a partial region of the SCR catalyst to cause ammonia slip and a nitrogen oxide (NOx) sensor at the rear end of the SCR catalyst misrecognizes the slipped ammonia as NOx to increase a supply amount of reducing agent. Therefore, an NOx purification rate of the SCR catalyst may be deteriorated and an amount of ammonia slipped from the SCR catalyst may be continuously increased.

The above information disclosed in this Background section is only for enhancement of understanding of the background of the invention and therefore it may contain information that does not form the prior art that is already known in this country to a person of ordinary skill in the art.

SUMMARY OF THE INVENTION

In preferred aspects, provided is an exhaust purification system which may calculate accurately an amount of ammonia adsorbed in a selective catalytic reduction (SCR) catalyst. In particular, flow along arrangement of catalysts may be considered as uniform such that the exhaust purification system can control an injection amount of a reducing agent according to the amount of ammonia.

In one aspect, provided is an exhaust purification system of controlling an injection amount of a reducing agent. The exhaust purification system may include: a first catalyst installed on a rear exhaust pipe of an engine; a selective catalytic reduction (SCR) catalyst installed on the rear exhaust pipe of the first catalyst; a reducing agent injector which is installed on an exhaust pipe between the first catalyst and the SCR catalyst and configured to inject a reducing agent; and a controller configured to control an amount of the reducing agent injected from the reducing agent injector. Preferably, the SCR catalyst may include a plurality of slices along a flow of exhaust gas and each slice may include a plurality of cells having predetermined shapes having a uniform area wherein a total number of the plurality of the slices is represented by n and a total number of the cells is represented by m.

The term "slice" as used herein refers to a component in the SCR catalyst. Preferred slice is stackable or stacked to form the SCR catalyst as shown in FIG. 3. The slice suitably include materials required for the SCR catalyst.

The term "cell" as used herein refers to a piece or component of the slice, without limitation to the size or shapes thereof. For example, the cell in a single slice is formed to have a uniform size or uniform shape, or may be formed to have different shape or sizes. The cell may suitably include materials required for the SCR catalyst.

Upon stacking the slices, the cells from respective slice may be stacked along the stacking direction.

The controller may sequentially calculate: i) a respective amount of ammonia adsorbed in the cells of each slice from a first slice to a n-th slice wherein the amount of ammonia adsorbed in the cells constituting the i-th slice may be calculated by adding sequentially an amount of ammonia adsorbed in each cell from a first cell to an m-th cell of the i-th slice; ii) a total amount of ammonia adsorbed in the SCR catalyst, and iii) a required amount of the reducing agent based on the total amount of ammonia adsorbed in the SCR catalyst and an amount of nitrogen oxide introduced into the SCR catalyst. The controller may control the reducing agent injector to inject the required amount of reducing agent.

The controller may calculate i) the amount of ammonia adsorbed in the each slice based on the amount of ammonia adsorbed in the each cell, ii) an additional adsorption amount of ammonia of the each cell according to the amount of ammonia supplied to the each cell, iii) an amount of ammonia participating in a chemical reaction of the each cell, and iv) an amount of ammonia slipped from the each cell.

The controller may calculate i) the amount of ammonia supplied to the each cell constituting the i-th slice depending on a concentration of ammonia supplied to the i-th slice; ii) a volume of the each cell constituting the i-th slice; and iii) a flow factor of the each cell constituting the i-th slice.

The term "adsorption amount" as used herein refers to an amount of material adsorbed in each cell, each slice, or the SCR catalyst. The amount of material adsorbed in each cell, each slice, or the SCR catalyst can be predicted from maps and models defining the characteristics of the SCR catalyst.

The term "flow factor" as used herein refers to a factor associated with flow uniformity. If the flow factor is 1, an amount of the ammonia flowing through each cell is the same. However, the flow factor is 0, all the ammonia flows though only one cell.

The term "slipped ammonia" is meant by the ammonia slipped from each cell, each slice, or the SCR catalyst that does not reacts the NOx and exhausted from each cell, each slice, or the SCR catalyst. The slipped ammonia is detected by connecting a pipe to each cell and mounting a sensor to each pipe. Through the experimentations, the slipped characteristics of each cell is establishes in the model or the map.

The "i-th" slice is meant by a slice that is disposed at i-th position from the first slice along a first direction, or alternatively, from the first slice along a second direction, of the stacking direction.

The flow factor of the each cell may be predetermined according to an arrangement of the first catalyst and the SCR catalyst.

The flow factor of the j-th cell of the i-th slice may be the same as the flow factor of the j-th cell of the (i+1)-th slice.

The amount of ammonia slipped from a j-th cell of the i-th slice is the same as the amount of ammonia supplied to a j-th cell of the (i+1)-th slice.

A total of amounts of ammonia slipped from the each cell of the i-th slice may be the same as the amount of ammonia slipped from the i-th slice.

A total of amounts of ammonia slipped from the each cell of the n-th slice may be the same as an amount of ammonia slipped from the SCR catalyst.

The controller may calculate: i) an additional adsorption amount of ammonia of the each cell of the i-th slice based on an amount of ammonia supplied to the each cell of the i-th slice; ii) a relative adsorption rate of the each cell of the i-th slice; and iii) an adsorption factor of the each cell of the i-th slice according to a temperature of the SCR catalyst.

The amount of ammonia participating in the chemical reaction of the each cell may be calculated, by the controller, based on a total amount of ammonia consumed in reduction of nitrogen oxide in the each cell, an amount of ammonia participating in generation of nitrous oxide ($N_2O$) in the each cell, and an amount of ammonia oxidized in the each cell.

The amount of ammonia consumed in reduction of nitrogen oxide in each cell may be calculated, by the controller, based on a nitrogen oxide purification rate of the each cell, an amount of nitrogen oxide introduced into the each cell, a temperature of the SCR catalyst, a ratio of ammonia to nitrogen oxide in the each cell, a deterioration factor of the each cell, and an injected state of the reducing agent.

The term "deterioration factor" as used herein refers to capability degradation as time goes by. For example, the ability of adsorbing the ammonia in each cell is deteriorated as time goes by. Therefore, the deterioration factor means a ratio of the ability of an old catalyst to the ability of a fresh catalyst.

The amount of ammonia participating in generation of nitrous oxide in each cell may be calculated, by the controller, based on the temperature of the SCR catalyst, the flow rate of the exhaust gas, the amount of ammonia adsorbed in the each cell, the additional adsorption amount of ammonia of the each cell according to the amount of ammonia supplied to the each cell, and the amount of ammonia consumed in the reduction of nitrogen oxide in the each cell.

The amount of ammonia oxidized in each cell may be calculated, by the controller, based on the temperature of the SCR catalyst, the flow rate of the exhaust gas, the amount of ammonia adsorbed in the each cell, the additional adsorption amount of ammonia of the each cell according to the amount of ammonia supplied to the each cell, and the amount of ammonia consumed in the reduction of nitrogen oxide in the each cell.

The amount of ammonia slipped from each cell may be calculated, by the controller, based on the temperature of the SCR catalyst, the flow rate of the exhaust gas, the amount of ammonia adsorbed in the each cell, the additional adsorption amount of ammonia of the each cell according to the amount of ammonia supplied to the each cell, the amount of ammonia consumed in the reduction of nitrogen oxide in the each cell, the deterioration factor of the each cell, and the injected state of the reducing agent.

The required amount of reducing agent may be calculated, by the controller, based on the amount of nitrogen oxide introduced into the SCR catalyst, the entire amount of ammonia adsorbed in the SCR catalyst, the nitrogen oxide purification rate of the SCR catalyst, the temperature of the SCR catalyst, a volume velocity of the exhaust gas, and the deterioration factor of the SCR catalyst.

The exhaust purification system may further include a particulate filter configured to collect particulate matters included in the exhaust gas. Preferably, the particulate filter may be a selective catalytic reduction on diesel particulate filter (SDPF) coated with the SCR catalyst. The rear exhaust pipe of the SDPF may further include an additional SCR catalyst that reduces nitrogen oxide included in the exhaust gas using ammonia slipped in the SDPF.

The exhaust purification system may further include a particulate filter configured to collect particulate matters included in the exhaust gas. Preferably, the reducing agent injector and the SCR catalyst may be sequentially disposed on the rear exhaust pipe of the particulate filter.

The first catalyst may suitably be a lean NOx trap (LNT) catalyst. For example, the LNT catalyst may suitably include Pt, Pd, Rh, Ce, Ba, etc.

The first catalyst may suitably be an oxidation catalyst. For example, the oxidation catalyst may suitably include Pt, Pd, etc.

Further provided herein is a vehicle including the exhaust purification system as described herein.

According to various exemplary embodiments of the present invention, an amount of ammonia adsorbed in an SCR catalyst may be accurately calculated by considering flow uniformity according to the arrangement of catalysts, thereby accurately controlling an injection amount of reducing agent injected from the reducing agent injector.

Further, the amount of reducing agent required for the SCR catalyst may be injected, thereby decreasing a slip amount of ammonia and improving a NOx purification rate. Other aspects of the invention are disclosed infra.

DETAILED DESCRIPTION

Figure 1:
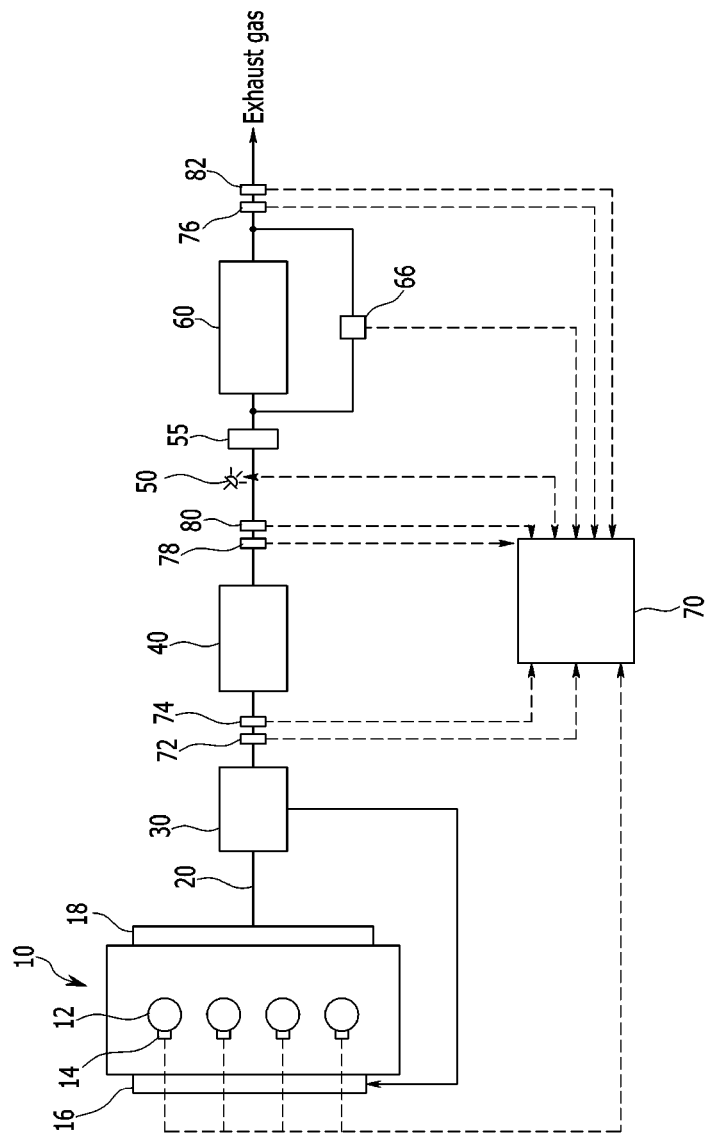
FIG. 1 shows an exemplary exhaust purification system according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In the following description, dividing names of components into first, second and the like is to divide the names because the names of the components are the same as each other and an order thereof is not particularly limited.

The terms used in the present specification are just for the purpose of describing specific exemplary embodiments and not intended to limit the present invention. As used in the present specification, singular forms are intended to include plural forms unless they have definitely opposite meanings in this context. In the present specification, it should be understood that the term "include" or "comprise" indicates that features, integers, steps, operations, constituent elements, and/or components described above are present, but does not exclude one or more other features, integers, steps, operations, constituent elements, components, and/or groups thereof. As used in the present specification, the term "and/or" includes any one of one or more associated and listed items and all combinations thereof. The term "coupled" indicates a physical connection between two components and herein, the components are directly connected to each other or indirectly connected to each other through one or more intermediate components.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

As used in the present specification, it should be understood that "vehicle", "vehicular", or other similar terms include automobiles, passenger automobiles typically including sport utility vehicles (SUV), buses, trucks, various commercial vehicles, vessels including various boats and ships, airplanes, etc., and includes hybrid vehicles, electric vehicles, hybrid electric vehicles, hydrogen powered vehicles and other alternative fuel vehicles (for example, fuels induced from resources other than petroleum). As described in the present invention, the electric vehicle (EV) is a vehicle which includes electric power obtained from a rechargeable energy storage device (for example, one or more rechargeable electrochemical cells or other types of batteries) as a part of locomotion capabilities. The EV is not limited to the vehicles, but may include motorcycles, carts, scooters, and the like. Further, the hybrid vehicles are vehicles having two or more power sources, for example, gasoline-based power and electric power (for example, a hybrid electric vehicle (HEV)).

Additionally, one or more following methods or aspects thereof may be executed by at least one controller, a controller area network (CAN), a bus, or a vehicle network. The controller, the controller area network (CAN), the bus, or the vehicle network may be implemented in the vehicle described in the present specification. The term "controller" may refer to a hardware device including a memory and a processor. The memory is configured to store program commands, and the processor is specifically programmed to execute the program commands performing one or more processes to be further described below. Furthermore, the following methods may be executed by the system including the controller in connection with one or more additional components as described below in detail.

Further, the method of the present specification may be implemented by a non-transitory computer readable storage medium on computer readable storage media including executable program commands executed by the processor, the controller, and the like. Examples of the computer readable storage media include ROMs, RAMs, compact disk (CD)-ROMs, magnetic tapes, floppy disks, flash drivers, smart cards, and optical data storage devices, but are not limited thereto. The computer readable storage media may also be distributed by a network coupled to the computer systems to be stored and executed in forms distributed by, for example, a telemetric sever or a CAN.

FIG. 1 is a schematic diagram illustrating an exemplary exhaust purification system according to an exemplary embodiment of the present invention.

As illustrated in FIG. 1, an exhaust purification system of an internal combustion engine may include an engine 10, an exhaust pipe 20, an exhaust gas recirculation (EGR) device 30, a lean NOx trap (LNT) catalyst 40, a reducing agent injector 50, a particulate filter 60, and a controller 70.

The engine 10 burns a mixture in which fuel and air are mixed to convert chemical energy into mechanical energy. The engine 10 may be connected to an intake manifold 16 to receive the air into a combustion chamber 12 and the exhaust gas generated in the combustion process may be collected in an exhaust manifold 18 and then discharged to the outside of the engine. An injector 14 may be installed in the combustion chamber 12 to inject the fuel into the combustion chamber 12.

Herein, a diesel engine is exemplified, but a lean burn gasoline engine may also be used. When the gasoline engine is used, the mixture may be introduced into the combustion chamber 12 through the intake manifold 16, and an ignition plug (not illustrated) for ignition may be installed on the combustion chamber 12. Further, when the gasoline is used in a direct injection (GDI) engine, the injector 14 may be installed on the combustion chamber 12, like a diesel engine.

The exhaust pipe 20 may be connected to the exhaust manifold 18 to discharge the exhaust gas to the outside of the vehicle. An LNT catalyst 40, a reducing agent injector 50 and a particulate filter 60 may be installed on the exhaust pipe 20 to remove hydrocarbon, carbon monoxide, particulate matters, and nitrogen oxide included in the exhaust gas.

The EGR device 30 may be installed on the exhaust pipe 20 to re-supply a part of the exhaust gas discharged from the engine 10 to the engine 10 through the EGR device 30. Further, the EGR device 30 may be connected to the intake manifold 16 to control a combustion temperature by mixing a part of the exhaust gas with the air. This control of the combustion temperature may be performed by controlling an amount of exhaust gas supplied to the intake manifold 16 under the control of the controller 70. Accordingly, a recirculation valve (not illustrated) controlled by the controller 70 may be installed on a line connecting the EGR device 30 and the intake manifold 16.

A first oxygen sensor 72 may be installed on a rear exhaust pipe 20 of the EGR device 30 to detect an amount of oxygen in the exhaust gas passing through the EGR device 30 and transmit the detected oxygen amount to the controller 70, such that the controller 70 may perform a lean/rich control of the exhaust gas. For example, a measured value of the first oxygen sensor 72 is referred to as an air-fuel ratio at the front end of the LNT.

Further, a first temperature sensor 74 may be installed on the rear exhaust pipe 20 of the EGR device 30 to detect a temperature of the exhaust gas that may pass through the EGR device 30.

The LNT catalyst 40 may be installed on the rear exhaust pipe 20 of the EGR device 30. The LNT catalyst 40 may adsorb nitrogen oxide (NOx) included in the exhaust gas in a lean atmosphere, may desorb the nitrogen oxide adsorbed in a rich atmosphere, and may reduce the nitrogen oxide included in the exhaust gas or the desorbed nitrogen oxide. Further, the LNT catalyst 40 may oxidize carbon monoxide (CO) and hydrocarbon (HC) included in the exhaust gas. Herein, desorbing of the nitrogen oxide adsorbed in the LNT catalyst 40 by forming the rich atmosphere is referred to as 'regeneration of the LNT.'

Herein, it should be understood that the hydrocarbon refer to any compounds consisting of carbon and hydrogen included in the exhaust gas and the fuel.

A second temperature sensor 78 and a first NOx sensor 80 may be installed on the rear exhaust pipe 20 of the LNT catalyst 40.

The second temperature sensor 78 may measure a temperature of the exhaust gas introduced into the particulate filter 60 to transmit a signal of the measured temperature to the controller 70.

The first NOx sensor 80 may measure an amount of NOx included in the exhaust gas introduced into the particulate filter 60 to transmit a signal of the measured amount to the controller 70. The amount of NOx measured by the first NOx sensor 80 may be used to determine the amount of reducing agent to be injected by the reducing agent injector 50.

The reducing agent injector 50 may be installed in the front exhaust pipe 20 of the particulate filter 60 and controlled by the controller 70 to inject the reducing agent to the exhaust gas. Like the related art, the reducing agent injector 50 may inject urea, and the injected urea may be converted into ammonia by hydrolysis, however, the reducing agent is not limited to the ammonia.

A mixer 55 may be installed on the rear exhaust pipe 20 of the reducing agent injector 50 to uniformly mix the reducing agent with the exhaust gas.

The particulate filter 60 may be installed on the rear exhaust pipe 20 of the mixer 55 to collect particulate matters included in the exhaust gas and reduce nitrogen oxide included in the exhaust gas using the reducing agent injected by the reducing agent injector 50. For this purpose, the particulate filter 60 may be a selective catalytic reduction on diesel particulate filter (SDPF) coated with the SCR catalyst, but is not limited thereto.

The SCR catalyst may suitably include both the SCR catalyst itself and the SDPF. Further, the LNT catalyst 40 and the SDPF 60 may be arranged in a straight line, but the arrangement thereof is not limited thereto. For instance, in order to increase space efficiency, the LNT catalyst 40 and the SDPF 60 may be arranged in a curved shape or in parallel. However, the exhaust gas may pass through the LNT catalyst 40 and the SDPF 60 in sequence.

The SDPF 60 may be formed by coating the SCR catalyst on a partition wall constituting a channel of the DPF. For instance, the DPF may include a plurality of inlet and outlet channels. One end of the inlet channel may be opened and the other end thereof may be closed, and thus, the inlet channel may receive the exhaust gas from the front end of the DPF. Further, one end of the outlet channel may be closed and the other end thereof may be opened, and thus, the outlet channel may discharge the exhaust gas in the DPF. The exhaust gas introduced to the DPF through the inlet channel may enter the outlet channel through a porous partition wall of partitioning the inlet channel and the outlet channel and then may be discharged from the DPF through the outlet channel. The particulate matters included in the exhaust gas may be collected while the exhaust gas may pass through the porous partition wall. In addition, the SCR catalyst coated on the SDPF 60 may reduce the nitrogen oxide included in the exhaust gas by using the reducing agent injected by the reducing agent injector 50.

Meanwhile, a differential pressure sensor 66 may be installed on the exhaust pipe 20. The differential pressure sensor 66 may measure a difference in pressure between the front end and the rear end of the SDPF 60 and transmit a signal for the measured difference to the controller 70. The controller 70 may control the SDPF 60 to be reproduced when the pressure difference measured by the differential pressure sensor 66 is equal to or greater than a predetermined pressure. In this case, the particulate matters collected in the SDPF 60 may be burned by post-injecting the fuel by the injector 14.

Further, a second oxygen sensor 76 and a second NOx sensor 82 may be installed on the rear exhaust pipe 20 of the SDPF 60.

The second oxygen sensor 76 may measure an amount of oxygen included in the exhaust gas discharged from the SDPF 60 and may transmit a signal for the measured amount to the controller 70. The controller 70 may perform the lean/rich control of the exhaust gas based on the detection values of the first oxygen sensor 72 and the second oxygen sensor 76. The measurement value of the second oxygen sensor 76 is referred to as an air-fuel ratio at the rear end of the SDPF.

The second NOx sensor 82 may detect an amount of nitrogen oxide included in the exhaust gas discharged from the SDPF 60 and transmit a signal for the measured amount to the controller 70. The controller 70 may monitor whether the SDPF 60 normally removes the nitrogen oxide included in the exhaust gas based on the detection value of the second NOx sensor 82. In other words, the second NOx sensor 82 may be used to evaluate the performance of the SDPF 60

The controller 70 may determine an operating condition of the engine based on the signals detected by the sensors and controls the lean/rich control and the amount of reducing agent injected by the reducing agent injector 50 based on the operating condition of the engine. For example, the controller 70 may control the air-fuel ratio to the rich atmosphere so as to remove nitrogen oxide from the LNT catalyst 40, which is referred to as 'regeneration of LNT', and remove nitrogen oxide from the SDPF 60 through the injection of the reducing agent. The lean/rich control may be performed by adjusting the amount of fuel injected by the injector 14 and an injection timing.

Meanwhile, the controller 70 may store a plurality of maps and a plurality of models defining the characteristics of the LNT, calculate the amount of ammonia adsorbed in the SDPF based on the maps and the models, and may control the injection amount of reducing agent according to the amount of ammonia adsorbed in the SDPF. The plurality of maps and models may be defined by many experiments.

Further, the controller 70 may perform regeneration of the SDPF 60 and desulfurization of the LNT catalyst 40.

As such, the controller 70 may be implemented by one or more processors that may be operated by a set program, and the set program may be programmed to perform each step of the method of calculating the injection amount of reducing agent according to the exemplary embodiment of the present invention.

Figure 2:
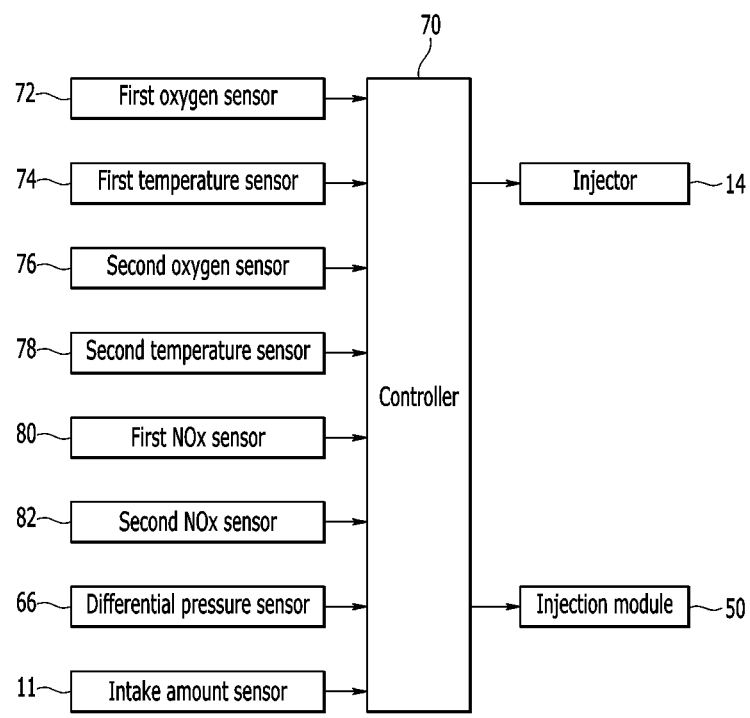
FIG. 2 shows an exemplary controller and an exemplary connection between input and output of the controller used in an exemplary method of calculating an injection amount of a reducing agent in an exemplary exhaust purification system according to an exemplary embodiment of the present invention.

FIG. 2 is a block diagram illustrating an exemplary controller and an exemplary connection between input and output of the controller used in an exemplary method of calculating an injection amount of a reducing agent in the exhaust purification system according to an exemplary embodiment of the present invention.

As illustrated in FIG. 2, the first oxygen sensor 72, the first temperature sensor 74, the second oxygen sensor 76, the second temperature sensor 78, the first NOx sensor 80, the second NOx sensor 82, the differential pressure sensor 66, and an intake amount sensor 11 may be electrically connected to the controller 70 and transmit the detected values to the controller 70.

The first oxygen sensor 72 may detect an amount of oxygen in the exhaust gas passing through the EGR device 30 to transmit a signal for the amount to the controller 70. The controller 70 may promote performing a lean/rich control of the exhaust gas based on the amount of oxygen in the exhaust gas detected by the first oxygen sensor 72. The value detected by the first oxygen sensor 72 may be represented by a front lambda. The lambda represents a ratio of an actual air-fuel ratio to a theoretical air-fuel ratio, and when the lambda is greater than about 1, the atmosphere is lean and if the lambda is less than 1, the atmosphere is rich.

The first temperature sensor 74 may detect a temperature of the exhaust gas passing through the EGR device 30 to transmit a signal of the detected temperature to the controller 70.

The second temperature sensor 78 may measure a temperature of the exhaust gas introduced into the SDPF 60 to transmit a signal for the measured temperature to the controller 70.

The first NOx sensor 80 may measure an amount of NOx included in the exhaust gas introduced into the SDPF 60 to transmit a signal for the measured amount to the controller 70.

The second oxygen sensor 76 may measure an amount of oxygen included in the exhaust gas discharged from the SDPF 60 to transmit a signal for the measured amount to the controller 70. The value detected by the second oxygen sensor 76 may be represented by a rear lambda. The controller 70 may perform the regeneration of the LNT catalyst 40 based on the front lambda and the rear lambda.

The second NOx sensor 82 may detect an amount of nitrogen oxide included in the exhaust gas discharged from the SDPF 60 to transmit a signal for the detected amount to the controller 70.

The differential pressure sensor 66 may measure a difference in pressure between the front end and the rear end of the SDPF 60 to transmit a signal for the measured difference to the controller 70.

The intake amount sensor 11 may detect an amount of intake air supplied to the intake device of the engine 10 to transmit a signal for the detected amount to the controller 70.

The controller 70 may determine an engine operating condition, a fuel injection amount, a fuel injection timing, a fuel injection pattern, a reducing agent injection amount, a regeneration timing of the SDPF 60, and a regeneration/desulfurization timing of the LNT catalyst 40 based on the transmitted values and outputs signals for controlling the injector 14 and the reducing agent injector 50 to the injector 14 and the reducing agent injector 50. Moreover, the controller 70 may calculate an amount of ammonia adsorbed in the SDPF 60 based on the transmitted values and calculate an amount of reducing agent to be injected by the reducing agent injector 50 based on the calculated amount.

Meanwhile, in an exemplary exhaust purification system according to an exemplary embodiment of the present invention, a plurality of sensors may be installed in addition to the sensors shown in FIG. 2, but will be omitted for the convenience of description.

Further, the locations of the sensors may be changed if necessary, and are not limited to the locations shown in FIG. 1.

Hereinafter, a method of calculating an injection amount of a reducing agent according to the exemplary embodiment of the present invention will be described in detail.

Figure 6:
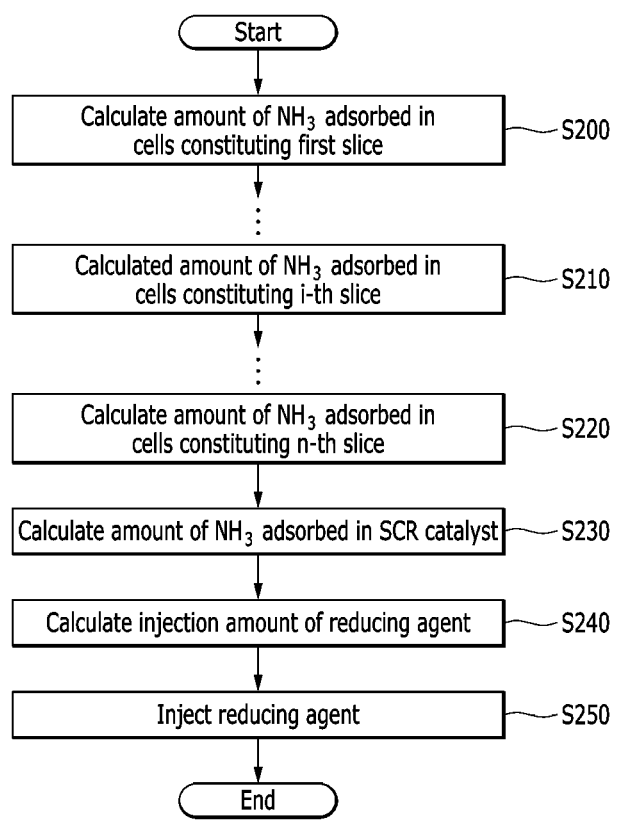
FIG. 6 is an exemplary method of calculating an injection amount of a reducing agent in the exhaust purification system according to an exemplary embodiment of the present invention.
Figure 7:
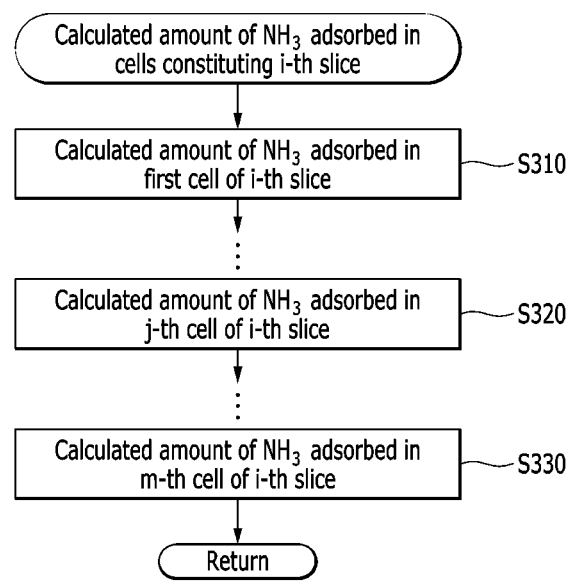
FIG. 7 is an exemplary method of calculating an injection amount of a reducing agent in the exhaust purification system according to an exemplary embodiment of the present invention.
Figure 8:
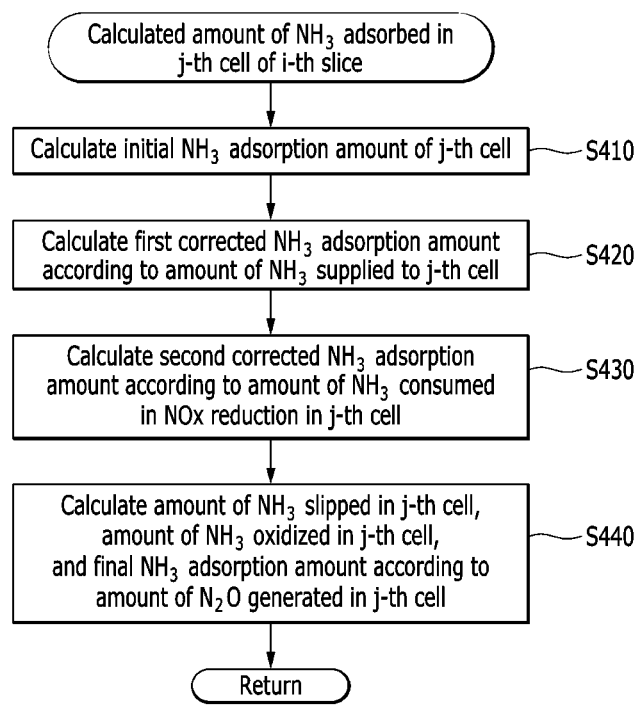
FIG. 8 is an exemplary method of calculating an injection amount of a reducing agent in the exhaust purification system according to an exemplary embodiment of the present invention.

FIGS. 6 to 8 are flowcharts illustrating exemplary methods of calculating an injection amount of a reducing agent in exemplary exhaust purification systems according to various exemplary embodiments of the present invention.

Figure 3:
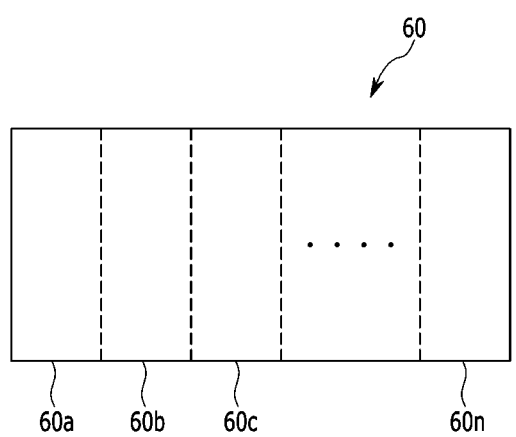
FIG. 3 shows an exemplary SCR catalyst including n slices in an exemplary embodiment of the present invention.

In order to perform the method of calculating the injection amount of reducing agent according to an exemplary embodiment of the present invention, the controller 70 may divide and recognize the SDPF 60 into n slices as illustrated in FIG. 3. For instance, the SDPF 60 may be divided into n slices 60a, 60b, . . . , 60n, such that the SDPF 60 may include the slices from the first slice 60a to the n-th slice 60n.

The n slices 60a, 60b, . . . , 60n may be arranged in sequence according to the flow of the exhaust gas and may be divided physically or virtually. Herein, the lengths of the respective slices may be the same as each other. As a result, a memory capacity, a calculation time, and the like may be minimized.

Figure 4:
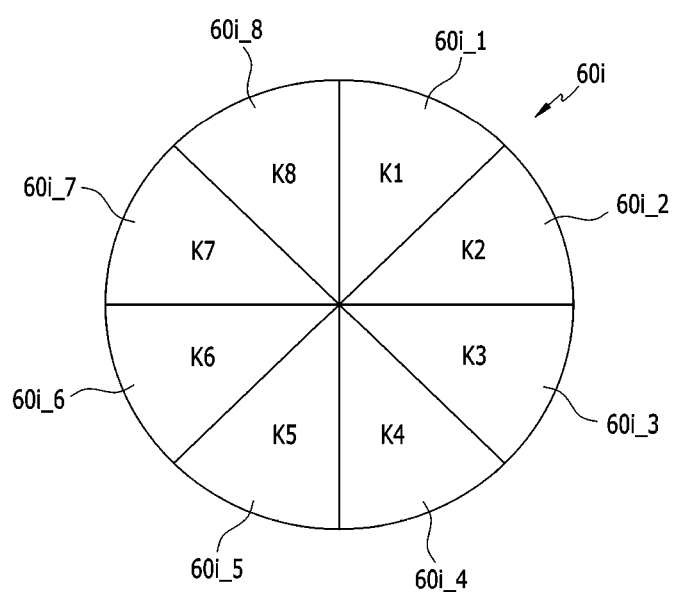
FIG. 4 is a cross-sectional view of an exemplary configuration of cells of an i-th slice in an exemplary embodiment of the present invention.
Figure 5:
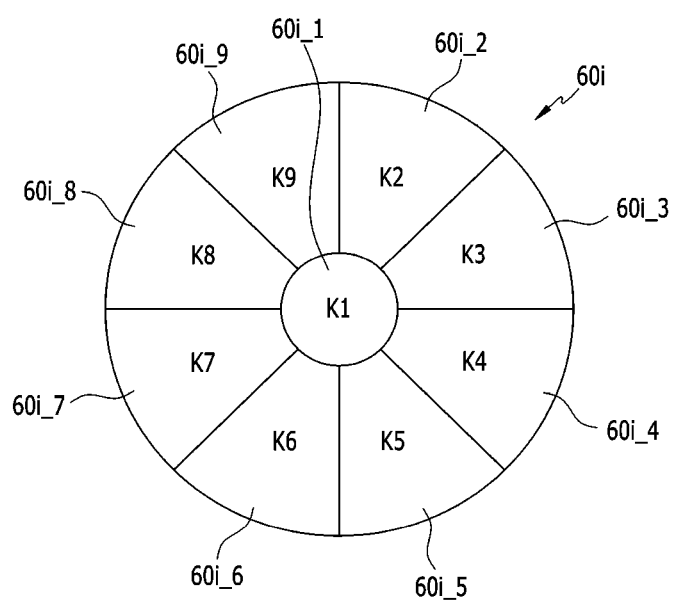
FIG. 5 is a cross-sectional view illustrating an exemplary configuration of cells of an i-th slice in an exemplary embodiment of the present invention.

Further, the controller 70 may divide and recognize each slice into m cells. Examples of the configuration of the cell may be illustrated in FIGS. 4 and 5. In FIG. 4, it is illustrated that the i-th slice 60i is configured by 8 cells 60i_1, 60i_2, . . . , 60i_8, and in FIG. 5, it is illustrated that the i-th slice 60i is configured by 9 cells 60i_1, 60i_2, . . . , 60i_9, but the present invention is not limited thereto. Each slice may include m cells. The number of cells constituting each slice may be determined by a designer by considering accuracy of the calculation, a memory capacity, and a calculation time. Further, the j-th cell of one slice may be located at the same position as the j-th cell of the other slice in radial, and circumferential directions and the shapes thereof may be also the same as each other. Furthermore, the areas of the cells may be the same as each other. For instance, as shown in FIG. 4, each cell may have a fan shape and a central angle thereof may be the same. In addition, as shown in FIG. 5, circular cells may be located at the center and the cells of the fan-shaped pieces, by cutting the circular cell portion, having the same central angle may be located around the circular cells. The area of the circular cell may be obtained by dividing the entire cross-sectional area of the SDPF 60 by m, and herein, m is the number of cells. The areas of the respective cells may be the same as each other and the position and shape of the j-th cell in each slice may be the same, thereby minimizing the capacity of the memory and the calculation time.

The number of slices, the shape of the slice, the number of cells, and the shape of the cell are not limited to those exemplified herein, and may be set by the designer in consideration of the accuracy of model calculation.

In each cell, physical/chemical characteristics such as the concentration of nitrogen oxides, the concentration of ammonia, and the temperature may be the same. Further, it is also assumed that the exhaust gas, the NOx, the ammonia, and the like may not be movable between the cells constituting each slice. For instance, the exhaust gas, the NOx, the ammonia, and the like in the j-th cell of the i-th slice may not move to other cells (cells other than the j-th cell) of the i-th slice. Instead, the exhaust gas, the NOx, the ammonia, and the like in the j-th cell of the i-th slice may move only to the j-th cell of the (i+1)-th slice.

Meanwhile, each cell may have a flow factor associated with the flow uniformity of the exhaust gas and the ammonia. For instance, when the flow factor of the first cell in each slice is kl and the flow factor of the j-th cell in each slice is kj, the flow factor of the j-th cell in the i-th slice may be the same as the flow factor of the j-th cell in the (i+1)-th slice. The flow factors may be preset according to the arrangement of the LNT catalyst 40 and the SDPF 60. For example, the flow factors may be predetermined by installing at least one exhaust pipe connected to each slice and measuring the amount of ammonia discharged from each exhaust pipe. Preferably, the average value of the flow factors of all the cells constituting each slice may be about 1. Also, when the values of the flow factors of all the cells are about 1, the exhaust gas and the ammonia may be ideally uniformly mixed. The amount of ammonia supplied to any cell constituting the i-th slice may be calculated by multiplying the concentration of ammonia supplied to the i-th slice, the volume of the corresponding cell, and the flow factor of the corresponding cell. The amount of ammonia supplied to any cell constituting the i-th slice may also be calculated by a method other than the above method.

As illustrated in FIG. 6, the controller 70 may calculate the amount of ammonia adsorbed in the cells constituting the first slice (S200). The controller 70 may calculate the amount of ammonia adsorbed in the cells constituting the second to n-th slices in the same manner (S210 and S220).

The following description demonstrates an exemplary method of calculating the amount of ammonia adsorbed in the cells constituting the i-th slice.

For instance, the i-th slice may include m cells. As illustrated in FIG. 7, the controller 70 may calculate the amount of ammonia adsorbed in the first cell of the i-th slice (S310). The controller 70 may calculate the amount of ammonia adsorbed in the cells constituting the second to m-th slices in the same manner (S310 and S320). When the controller 70 calculates the amount of ammonia adsorbed in the cells constituting the m-th slice, the controller 70 may return to step S210 and calculate the amount of ammonia adsorbed in the cells constituting the (i+1)-th slice.

The following description demonstrates an exemplary method of calculating the amount of ammonia adsorbed in the j-th cell constituting the i-th slice.

As illustrated in FIG. 8, the controller 70 may calculated an initial adsorption amount of ammonia of the j-th cell of the i-th slice (S410). The initial adsorption amount of ammonia of the j-th cell may be the same as the adsorption amount of ammonia of the j-th cell which is previously calculated. When the exhaust purification system (i.e., vehicle) is used for the first time, the initial adsorption amount of ammonia in all the cells constituting the exhaust purification system may be about 0 or 0.

Thereafter, the controller 70 may calculate a first corrected adsorption amount of ammonia according to the amount of ammonia supplied to the j-th cell (S420). The amount of ammonia supplied to the j-th cell of the i-th slice may be the same as the amount of ammonia slipped in the j-th cell of the (i−1)-th slice. Also, the amount of ammonia supplied to the j-th cell may be calculated according to the amount of reducing agent injected after the previous calculation of the adsorption amount of ammonia.

Particularly, the amount of reducing agent injected after the previous calculation of the adsorption amount of ammonia may be converted to the amount of ammonia injected according to a conversion rate to the ammonia of the reducing agent. The controller 70 may calculate the concentration of ammonia using the injected amount of ammonia and the flow rate of the exhaust gas. Thereafter, the amount of ammonia supplied to the corresponding cell may be calculated by using the concentration of ammonia, the flow factor of each cell constituting the first slice, and the volume of the corresponding cell. Further, a relative adsorption rate of the corresponding cell, e.g., current adsorption amount of ammonia of the corresponding cell/maximal adsorption amount of ammonia of the corresponding cell at a current temperature of SDPF, and an adsorption factor of the corresponding cell according to the temperature of the SDPF 60 may be calculated. Thereafter, the controller may calculate an additive adsorption amount of ammonia of the corresponding cell by multiplying the adsorption factor of the corresponding cell by the amount of ammonia supplied to the corresponding cell. As a result, the first corrected adsorption amount of ammonia according to the amount of ammonia supplied to the j-th cell may be calculated by the following equation.

$$NH_3(ads\_cor1)=NH_3(ads\_ini)+NH_3(ads\_add)$$

Herein, $NH_3(ads\_cor1)$ represents the first corrected adsorption amount of ammonia, $NH_3(ads\_ini)$ represents the initial adsorption amount of ammonia, and $NH_3(ads\_add)$ represents the additional adsorption amount of ammonia.

Thereafter, the controller 70 may perform steps S420 to S440 with respect to all the cells constituting the first slice to calculate the additional adsorption amount of ammonia of all the cells constituting the first slice, the amount of ammonia participating in a chemical reaction in all the cells, and the amount of ammonia slipped from all the cells and finally calculate the amount of ammonia adsorbed in all the cells. Thereafter, the controller 70 may return to step S310 and performs steps S410 to S440 with respect to the second slice to the (i−1)-th slice. As described above, the amount of ammonia slipped in the j-th cell of the (i−1)-th slice may be equal to the amount of ammonia supplied to the j-th cell of the i-th slice.

After the first corrected adsorption amount of ammonia according to the amount of ammonia supplied to the j-th cell is calculated, the controller 70 may calculate a second corrected adsorption amount of ammonia according to the amount of NH3 consumed in the reduction of nitrogen oxide in the j-th cell (S430).

The following description demonstrates an exemplary method of calculating the amount of second corrected adsorption amount of ammonia.

The controller 70 may calculate a nitrogen oxide purification rate of the j-th cell. The nitrogen oxide purification rate may be calculated according to a temperature of the SDPF 60, a flow rate of the exhaust gas, a deterioration factor, an injected state of the reducing agent, and a ratio of NO2/NOx in the corresponding cell. Herein, the deterioration factor may be calculated from the use history of the SDPF 60, and the injected state of the reducing agent may be a value indicating whether the reducing agent is injected. As an example, when the reducing agent is injected, the injected state of the reducing agent outputs a value of '1', and when the reducing agent is not injected, the injected state of the reducing agent may output a value of '0'. A function of calculating the nitrogen oxide purification rate may vary depending on the injected state of the reducing agent. Further, the ratio of NO2/NOx in the corresponding cell may be calculated from the ratio of $NO_2$ and $NO_x$ introduced into the corresponding cell. In one example, the ratio of $NO_2$ and $NO_x$ introduced into the SDPF 60 may be represented by the ratio of $NO_2/NO_x$ in the corresponding cell.

Thereafter, the controller may calculate the amount of ammonia consumed in the reduction of nitrogen oxide in the j-th cell. The amount of ammonia consumed in the reduction of nitrogen oxide in the j-th cell may be calculated depending on the nitrogen oxide purification rate of the cell, the amount of nitrogen oxide introduced into the corresponding cell, the temperature of the SDPF 60, the ratio of NH3/NOx in each cell, the deterioration factor of the corresponding cell, and the injected state of the reducing agent. The ratio of $NH_3/NO_x$ in each cell can be calculated from the amount of NH3 adsorbed in each cell and the amount of NOx introduced into each cell.

As a result, the second corrected adsorption amount ($NH_3(ads\_cor2)$) of ammonia depending on the amount of $NH_3$ consumed in the nitrogen oxide reduction in the j-th cell is calculated by the following equation.

$$NH_3(ads\_cor2)=NH_3(ads\_cor1)-NH_3(nox)$$

Herein, $NH_3(nox)$ means the amount of ammonia consumed in the reduction of nitrogen oxide.

The controller 70 may calculate a final adsorption amount of ammonia of the j-th cell depending on an amount of ammonia slipped in the j-th cell, an amount of ammonia associated with the generation of nitrous oxide (N2O) in the j-th cell, and an amount of ammonia oxidized in each cell (S440). Herein, the amount of ammonia associated with the generation of nitrous oxide ($N_2O$) oxidized in the j-th cell, the amount of ammonia oxidized in each cell, and the amount of ammonia consumed in the reduction of nitrogen oxide in the j-th cell may be commonly referred to as the amount of ammonia participating in the chemical reaction in the j-th cell.

The following description demonstrates an exemplary method of calculating the final adsorption amount of ammonia in the j-th cell will be described in detail as follows.

The controller 70 may calculate the amount of ammonia slipped in the j-th cell depending on a temperature of the SDPF 60, a flow rate of the exhaust gas, a second corrected adsorption amount of ammonia, a ratio of the second corrected adsorption amount of ammonia and a maximum adsorption amount of ammonia at a current temperature, a deterioration factor, and the injected state of the reducing agent. In addition, the controller 70 may calculate the amount of ammonia associated with the generation of nitrous oxide (N2O) in the j-th cell and the amount of ammonia oxidized in the j-the cell depending on the temperature of the SDPF 60, the flow rate of the exhaust gas, the second corrected adsorption amount of ammonia, and the ratio of the second corrected adsorption amount of ammonia and the maximum adsorption amount of ammonia at the current temperature. Herein, the oxidization of ammonia means that the ammonia is converted into nitrogen oxide or converted into nitrogen gas (N2). Thereafter, the controller 70 may calculate the final adsorption amount ($NH_3(ads\_fin)$) of ammonia of the j-the cell.

$$NH_3(ads\_fin)=NH_3(ads\_cor2)-NH_3(sli)-NH_3(oxi)-NH_3(n2o)$$

Herein, $NH_3(sli)$ represents the amount of ammonia slipped in the j-th cell, $NH_3(oxi)$ represents the amount of ammonia oxidized in the j-th cell, and $NH_3(n2o)$ represents the amount of ammonia participating in the generation of nitrous oxide ($N_2O$) in the j-th cell The controller 70 may store the final adsorption amount ($NH_3(ads\_fin)$) of ammonia of the j-the cell as the amount of ammonia adsorbed in the j-th cell and returns to step S320.

The controller 70 may repeat steps S320 and S330, and steps S410 to S440 based on the steps to calculate/store the amount of ammonia adsorbed in all the cells constituting the first to n-th slices. Thereafter, the controller 70 may return to step S220.

The controller 70 may calculate the entire amount of ammonia adsorbed in the SDPF 60 based on the amount of ammonia adsorbed in all of the cells constituting the first to n-th slices (S230). For example, the entire amount of ammonia adsorbed in the SDPF 60 may be the sum of the amounts of ammonia adsorbed in all of the cells constituting the first to n-th slices. Also, the controller 70 may calculate the amount of ammonia slipped from the SDPF 60 by summing the amounts of ammonia slipped from all the cells constituting the n-th slice.

The controller 70 may calculate the injection amount of reducing agent, or alternatively, a required amount of reducing agent, based on the total amount of ammonia adsorbed in the SDPF 60 (S240). For example, the required amount of reducing agent may be calculated depending on the amount of nitrogen oxide introduced into the SDPF 60, which is calculated from the amount of nitrogen oxide generated according to engine operating condition and the amount of nitrogen oxide adsorbed in the LNT catalyst 40, the total amount of ammonia adsorbed in the SDPF 60, the nitrogen oxide purification rate of the SDPF 60, which is calculated from the temperature of the SDPF 60, the ratio of nitrogen oxide introduced into the SDPF 60 and $NO_2$, or the like, the temperature of the SDPF 60 The temperature, the ratio of ammonia to nitrogen oxide in each cell, the deterioration factor of each cell, and the injected state of the reducing agent.

Thereafter, the controller 70 may control the reducing agent injector 50 to inject the reducing agent by the required amount of ammonia (S250). Accordingly, the slip amount of ammonia may be reduced and the nitrogen oxide purification rate may be improved.

FIGS. 9 to 12 are schematic diagrams illustrating various exemplary configurations of catalysts which may be used in exemplary exhaust purification systems according to various exemplary embodiments of the present invention.

Figure 9:
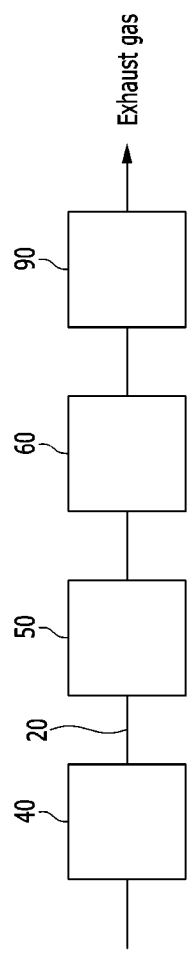
FIG. 9 is an exemplary configuration of an exemplary catalyst which may be used in an exemplary exhaust purification system according to an exemplary embodiment of the present invention.

As illustrated in FIG. 9, according to an exemplary configuration of exemplary catalysts, the LNT catalyst 40, the reducing agent injector 50, the SDPF 60, and the additional SCR catalyst 90 may be disposed sequentially to the exhaust pipe 20 from the engine. The LNT catalyst 40, the reducing agent injector 50, and the SDPF 60 are described above, and herein, the detailed description will be omitted.

The additional SCR catalyst 90 may be installed in the rear exhaust pipe 20 of the SDPF 60. The additional SCR catalyst 90 may additionally reduce the nitrogen oxide when the nitrogen oxide is not completely purified in the SDPF 60. The additional SCR catalyst 90 may be installed to be physically separated from the SDPF 62 or integrated with one catalyst converter. The ammonia slipped in the SDPF 60 acts as a reducing agent to reduce nitrogen oxide in the additional SCR catalyst 90. Accordingly, the additional SCR catalyst 90 may be a passive SCR catalyst.

Figure 10:
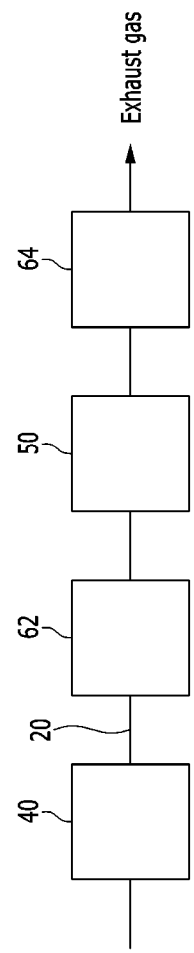
FIG. 10 is an exemplary configuration of an exemplary catalyst which may be used in an exemplary exhaust purification system according to an exemplary embodiment of the present invention.

As illustrated in FIG. 10, according to an exemplary configuration of exemplary catalysts, the LNT catalyst 40, the particulate filter 62, the reducing agent injector 50 and the SCR 64 may be sequentially installed on the exhaust pipe 20. When comparing the second configuration of the catalysts with the first configuration of the catalysts, the SDPF 60 of the first configuration may be divided into the particulate filter 62 and the SCR catalyst 64 and the reducing agent injector 50 may be disposed between the particulate filter 62 and the SCR catalyst 64. Although there is a difference in arrangement of the catalysts, the method of calculating the amount of ammonia adsorbed in the SDPF described above is applied to the SCR catalyst 64 in the same manner.

Figure 11:
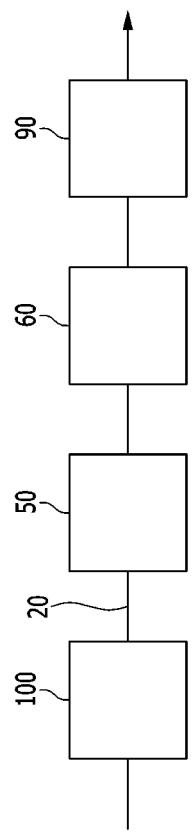
FIG. 11 is an exemplary configuration of an exemplary catalyst which may be used in an exemplary exhaust purification system according to an exemplary embodiment of the present invention.

As illustrated in FIG. 11, according to an exemplary configuration of exemplary catalysts, an oxidation catalyst 100, the reducing agent injector 50, the SDPF 60 and the additional SCR catalyst 90 may be sequentially installed on the exhaust pipe 20. The oxidation catalyst 100 may oxidize CO, HC, NO, and the like included in the exhaust gas. When comparing the third configuration with the first configuration, the LNT catalyst 40 of the first configuration may be replaced with the oxidation catalyst 100. Whether the LNT catalyst 40 or the oxidation catalyst 100 is used may be determined by the designer by considering the operating condition of the engine, the target performance, and the like. Further, both the LNT catalyst 40 and the oxidation catalyst 100 may be used when the installation space for the catalysts is sufficient. Herein, the catalysts disposed at the front end of the LNT catalyst 40 or the oxidation catalyst 100 will be all referred to as the first catalyst.

Figure 12:
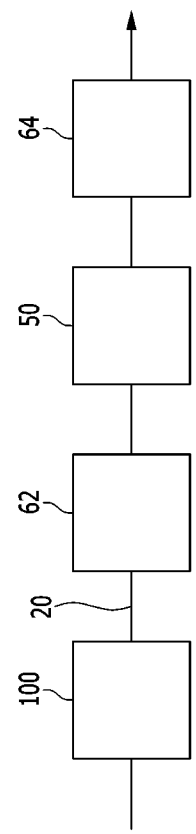
FIG. 12 is an exemplary configuration of an exemplary catalyst which may be used in an exemplary exhaust purification system according to an exemplary embodiment of the present invention.

As illustrated in FIG. 12, according to an exemplary configuration of exemplary catalysts, the oxidation catalyst 100, the particulate filter 62, the reducing agent injector 50, and the SCR catalyst 64 may be sequentially disposed. Although there is a difference in arrangement of the catalysts, the method of calculating the amount of ammonia adsorbed in the SDPF described above is applied to the SCR catalyst 64 in the same manner.

While this invention has been described in connection with what is presently considered to be various exemplary embodiments, it is to be understood that the invention is not limited to the disclosed embodiments, but, on the contrary, is intended to cover various modifications and equivalent arrangements included within the spirit and scope of the appended claims.

What is claimed is:

1. An exhaust purification system of controlling an injection amount of a reducing agent, comprising:
    a first catalyst installed on an exhaust pipe;
    a selective catalytic reduction (SCR) catalyst installed on the exhaust pipe;
    a reducing agent injector which is installed on the exhaust pipe between the first catalyst and the SCR catalyst and configured to inject a reducing agent; and
    a controller configured to control an amount of the reducing agent injected from the reducing agent injector;
    wherein the SCR catalyst comprises a plurality of slices along a flow of exhaust gas and each slice comprises a plurality of cells having predetermined shapes having an uniform area wherein a total number of the plurality of the slices is represented by n and a total number of the cells is represented by m,
    wherein the controller sequentially calculates:
    i) a respective amount of ammonia adsorbed in the cells of each slice, sequentially from a first slice to a n-th slice, wherein an amount of ammonia adsorbed of an i-th slice is calculated by adding sequentially an amount of ammonia adsorbed in each cell from a first cell to a m-th cell of the i-th slice, ii) a total amount of ammonia adsorbed in the SCR catalyst, and iii) a required amount of the reducing agent based on the total amount of the ammonia adsorbed in the SCR catalyst and an amount of nitrogen oxide introduced into the SCR catalyst;

wherein the controller controls the reducing agent injector to inject the required amount of the reducing agent; and wherein the controller calculates:

i) the amount of ammonia adsorbed in each slice from the amount of ammonia adsorbed in the each cell, ii) an additional adsorption amount of ammonia of the each cell according to the amount of ammonia supplied to the each cell, iii) an amount of ammonia participating in a chemical reaction of the each cell, and iv) an amount of ammonia slipped from the each cell.

2. The exhaust purification system of claim 1, wherein the controller calculates:

i) the amount of ammonia supplied to the each cell of the i-th slice depending on a concentration of ammonia supplied to the i-th slice, ii) a volume of the each cell of the i-th slice, and iii) a flow factor of the each cell of the i-th slice.

3. The exhaust purification system of claim 2, wherein: the flow factor of the each cell is predetermined according to an arrangement of the first catalyst and the SCR catalyst.

4. The exhaust purification system of claim 3, wherein: the flow factor of a j-th cell of the i-th slice is the same as a flow factor of the j-th cell of the (i+1)-th slice.

5. The exhaust purification system of claim 2, wherein: the amount of ammonia slipped from in a j-th cell of the i-th slice is the same as an amount of ammonia supplied to a j-th cell of the (i+1)-th slice.

6. The exhaust purification system of claim 5, wherein: a total of amounts of ammonia slipped from the each cell of the i-th slice is the same as the amount of ammonia slipped from the i-th slice.

7. The exhaust purification system of claim 6, wherein: a total of amounts of ammonia slipped from the each cell of the n-th slice is the same as an amount of ammonia slipped from the SCR catalyst.

8. The exhaust purification system of claim 2, wherein the controller calculates:

i) an additional adsorption amount of ammonia of the each cell of the i-th slice depending on an amount of ammonia supplied to the each cell constituting the i-th slice, ii) a relative adsorption rate of the each cell of the i-th slice, and iii) an adsorption factor of the each cell of the i-th slice according to a temperature of the SCR catalyst.

9. The exhaust purification system of claim 1, wherein: the amount of ammonia participating in the chemical reaction of the each cell is calculated, by the controller, based on a total amount of ammonia consumed in reduction of nitrogen oxide in the each cell, an amount of ammonia participating in generation of nitrous oxide (N2O) in the each cell, and an amount of ammonia oxidized in the each cell.

10. The exhaust purification system of claim 9, wherein: the amount of ammonia consumed in the reduction of nitrogen oxide in the each cell is calculated, by the controller, based on a nitrogen oxide purification rate of the each cell, an amount of nitrogen oxide introduced into the each cell, a temperature of the SCR catalyst, a ratio of ammonia to nitrogen oxide in the each cell, a deterioration factor of the each cell, and an injected state of the reducing agent.

11. The exhaust purification system of claim 9, wherein: the amount of ammonia participating in generation of nitrous oxide in the each cell is calculated, by the controller, based on the temperature of the SCR catalyst, the flow rate of the exhaust gas, the amount of ammonia adsorbed in the each cell, the additional adsorption amount of ammonia of the each cell according to the amount of ammonia supplied to the each cell, and the amount of ammonia consumed in the reduction of nitrogen oxide in the each cell.

12. The exhaust purification system of claim 9, wherein: the amount of ammonia oxidized in the each cell is calculated, by the controller, based on the temperature of the SCR catalyst, the flow rate of the exhaust gas, the amount of ammonia adsorbed in the each cell, the additional adsorption amount of ammonia of the each cell according to the amount of ammonia supplied to the each cell, and the amount of ammonia consumed in the reduction of nitrogen oxide in the each cell.

13. The exhaust purification system of claim 10, wherein: the amount of ammonia slipped from the each cell is calculated, by the controller, based on the temperature of the SCR catalyst, the flow rate of the exhaust gas, the amount of ammonia adsorbed in the each cell, the additional adsorption amount of ammonia of the each cell according to the amount of ammonia supplied to the each cell, the amount of ammonia consumed in the reduction of nitrogen oxide in the each cell, the deterioration factor of the each cell, and the injected state of the reducing agent.

14. The exhaust purification system of claim 10, wherein: the required amount of reducing agent is calculated, by the controller, based on the amount of nitrogen oxide introduced into the SCR catalyst, the entire amount of ammonia adsorbed in the SCR catalyst, the nitrogen oxide purification rate of the SCR catalyst, the temperature of the SCR catalyst, a volume velocity of the exhaust gas, and the deterioration factor of the each cell.

15. The exhaust purification system of claim 1, further comprising:

a particulate filter configured to collect particulate matters included in the exhaust gas, wherein the particulate filter is a selective catalytic reduction on diesel particulate filter (SDPF) coated with the SCR catalyst.

16. The exhaust purification system of claim 15, wherein: the exhaust pipe further comprises an additional SCR catalyst that reduces nitrogen oxide included in the exhaust gas using ammonia slipped in the SDPF.

17. The exhaust purification system of claim 1, further comprising:

a particulate filter configured to collect particulate matters included in the exhaust gas, wherein the reducing agent injector and the SCR catalyst are sequentially disposed on the exhaust pipe.

18. The exhaust purification system of claim 1, wherein: the first catalyst is a lean NOx trap (LNT) catalyst.

19. The exhaust purification system of claim 1, wherein: the first catalyst is an oxidation catalyst.

* * * * *